(12) United States Patent
Bartolome et al.

(10) Patent No.: US 12,159,460 B2
(45) Date of Patent: Dec. 3, 2024

(54) GENERATING CUSTOMIZED SUMMARIES OF VIRTUAL ACTIONS AND EVENTS

(71) Applicants: SONY INTERACTIVE ENTERTAINMENT LLC, San Mateo, CA (US); SONY INTERACTIVE ENTERTAINMENT INC., Tokyo (JP)

(72) Inventors: Angela Bartolome, San Mateo, CA (US); Supriti Dan, San Mateo, CA (US); Genie-Rose Luluquisin, San Mateo, CA (US); Benaisha Patel, San Mateo, CA (US); Celeste Bean, San Mateo, CA (US)

(73) Assignees: SONY INTERACTIVE ENTERTAINMENT LLC, San Mateo, CA (US); SONY INTERACTIVE ENTERTAINMENT INC., Tokyo (JP)

( * ) Notice: Subject to any disclaimer, the term of this patent is extended or adjusted under 35 U.S.C. 154(b) by 64 days.

(21) Appl. No.: 17/870,588

(22) Filed: Jul. 21, 2022

(65) Prior Publication Data
US 2024/0029437 A1 Jan. 25, 2024

(51) Int. Cl.
*G06V 20/40* (2022.01)
*A63F 13/53* (2014.01)
(Continued)

(52) U.S. Cl.
CPC .............. *G06V 20/47* (2022.01); *A63F 13/53* (2014.09); *A63F 13/85* (2014.09); *G06F 3/013* (2013.01)

(58) Field of Classification Search
CPC .......... G06V 20/47; A63F 13/53; A63F 13/85; G06F 3/01
(Continued)

(56) References Cited

U.S. PATENT DOCUMENTS 8,566,075 B1 10/2013 Bruner
9,308,445 B1 * 4/2016 Merzenich ............ A63F 13/537
(Continued)

FOREIGN PATENT DOCUMENTS

WO WO 2024/019819 1/2024
WO WO 2024/019820 1/2024

OTHER PUBLICATIONS

U.S. Appl. No. 17/870,546, Final Office Action dated Jul. 2, 2024.
(Continued)

*Primary Examiner* — Thai Q Tran
*Assistant Examiner* — Stephen R Smith
(74) *Attorney, Agent, or Firm* — Polsinelli LLP (57) ABSTRACT

A method and system for generating a customized summary of virtual actions and events. Gameplay data sent over a communication network from a client device of the player engaged in a current activity of the respective interactive content title within a current gameplay session may be monitored. A trigger in the monitored gameplay data is detected and associated with a request for a summary that encapsulates actions and events of past gameplay associated with the trigger. A subset of the actions and events of the past gameplay for the summary is selected based on one or more selected customized tags associated with the trigger. The summary is generated based on the selected subset of the actions and events and provided to the client device for presentation.

20 Claims, 6 Drawing Sheets

(51) Int. Cl.
*A63F 13/85* (2014.01)
*G06F 3/01* (2006.01)

(58) Field of Classification Search
USPC .............................................. 386/241; 461/1
See application file for complete search history.

(56) References Cited

U.S. PATENT DOCUMENTS

| | | | |
|---|---|---|---|
| 9,950,251 B1* | 4/2018 | Lewis | H04N 21/8456 |
| 10,299,008 B1 | 5/2019 | Catalano et al. | |
| 11,829,586 B2 | 11/2023 | Fong et al. | |
| 2006/0281403 A1 | 12/2006 | Richards et al. | |
| 2008/0206732 A1 | 8/2008 | Zalewski | |
| 2009/0011831 A1* | 1/2009 | Yamada | A63F 13/10 |
| | | | 463/43 |
| 2011/0281639 A1 | 11/2011 | Porat et al. | |
| 2013/0045804 A1 | 2/2013 | Ruke | |
| 2013/0121481 A1 | 5/2013 | Mikan et al. | |
| 2014/0184550 A1* | 7/2014 | Hennessey | G06F 3/041 |
| | | | 345/173 |
| 2015/0070150 A1 | 3/2015 | Levasque et al. | |
| 2016/0077547 A1 | 3/2016 | Aimone et al. | |
| 2016/0370860 A1 | 12/2016 | Bychkov et al. | |
| 2017/0064414 A1 | 3/2017 | Mickelsen et al. | |
| 2017/0085696 A1 | 3/2017 | Abkairov | |
| 2017/0188119 A1 | 6/2017 | Lacroix | |
| 2017/0304707 A1* | 10/2017 | Morton | A63B 71/0622 |
| 2018/0293996 A1 | 10/2018 | Mortis et al. | |
| 2018/0352303 A1 | 12/2018 | Siddique et al. | |
| 2018/0359349 A1 | 12/2018 | Graylin et al. | |
| 2019/0087006 A1 | 3/2019 | Rihn et al. | |
| 2019/0370036 A1 | 12/2019 | Desai et al. | |
| 2022/0379226 A1* | 12/2022 | Koch | A63F 13/79 |
| 2022/0387890 A1* | 12/2022 | Rispoli | H04N 21/214 |
| 2023/0071358 A1* | 3/2023 | van Welzen | A63F 13/355 |
| 2023/0237242 A1 | 7/2023 | Seroussi et al. | |
| 2024/0024783 A1 | 1/2024 | Walker et al. | |

OTHER PUBLICATIONS

PCT Application No. PCT/US2023/023875, International Search Report and Written Opinion dated Aug. 11, 2023.
PCT Application No. PCT/US2023/023974, International Search Report and Written Opinion dated Aug. 11, 2023.
U.S. Appl. No. 17/870,546, Non-Final Office Action dated Dec. 7, 2023.

* cited by examiner

| Object | Events |
|---|---|
| Activity 216 | activityAvailabilityChange (id[])<br>activityStart (id,location)<br>activityEnd(id,outcome,location) |
| Zone 252 | locationChange (id,location) |
| Actor 254 | actorSelect (id[]) |
| Mechanic 256 | mechanicAvailabilityChange (id[])<br>mechanicInventoryChange (id[])<br>mechanicLoadoutChange (id[])<br>mechanicUse (id[],...)<br>mechanicImpact (id,...) |
| Game Media 258 | gameMediaUnlock (id)<br>gameMediaStart (id)<br>gameMediaEnd (id) |

GENERATING CUSTOMIZED SUMMARIES OF VIRTUAL ACTIONS AND EVENTS

BACKGROUND OF THE INVENTION

1. Field of the Disclosure

The present technology pertains to generating customized summaries of virtual actions and events. More specifically, the present technology may generate customized summaries based on a trigger in monitored gameplay data.

2. Description of the Related Art

Presently available interactive media titles still face a wide range of accessibility issues for less advanced players to understand and fully experience gameplay. Advances in technology, driven, for example, by improving gameplay experiences for novice players (as well as players with attention-deficit disorders, memory impairment, etc.) have resulted in a more inclusive environment, but there is still a lot of room for improvement.

In many interactive media titles, there may be a number of actions and events that happen at the same time or over a period of time during which the player was not paying attention to an important story arch or gameplay moment. For novice players, the issue may be that they are not sure where to look at. In certain circumstances for other players, the issue may be that they are looking away and not paying attention.

Therefore, there is a need to provide a service that generates summaries of a subset of selected actions and events based on a particular trigger that indicates that the player may need a customized summary to assist in their gameplay.

SUMMARY OF THE CLAIMED INVENTION

Aspects of the present disclosure include systems and methods for generating a customized summary of virtual actions and events. One or more sets of object data may be stored in memory in association with one or more respective customized tags regarding a plurality of events in gameplay by a player of a respective interactive content title. Gameplay data sent over a communication network from a client device of the player engaged in a current activity of the respective interactive content title within a current gameplay session may be monitored. A trigger in the monitored gameplay data may be detected. The trigger may be associated with a request for a summary that encapsulates actions and events of past gameplay associated with the trigger. A subset of the actions and events of the past gameplay for the summary may be selected based on one or more selected customized tags associated with the trigger. The summary may be generated based on selected subset of the actions and events. The generated summary may be provided to the client device for presentation within a virtual environment associated with the interactive content title.

Gaze data may be tracked via a camera associated with the client device during the current gameplay session to identify a point of focus within a three-dimensional virtual environment of the respective interactive content title towards which one or both eyes of the player are focused. The point of focus indicated by the gaze data may be identified as not focused within the three-dimensional virtual environment during a period of distraction. The trigger may be based on the point of focus not focused within the three-dimensional virtual environment for more than threshold limit. The selected subset may include activities and events associated with the identified period of distraction.

A portion of the stored one or more sets of object data may be tagged with customized tags at an end of a gameplay session, wherein the portion selected for tagging was determined to have adjusted a relevant storyline of the interactive content title. Captured media clips may be stored associated with the customized tags. Other captured media clips that are not associated with the customized tags may be deleted. Generating the summary may include generating a highlight reel based on the stored captured media clips. The gameplay data may be indicative of at least one of objects, places, characters within a three-dimensional virtual environment or at least one of objectives, levels, and milestones within the interactive content title. An overlay that includes visual tags and respective metrics associated with virtual objects may be provided in a three-dimensional virtual environment of the respective interactive content title, wherein the virtual objects are visually tagged based on interaction with the player during one of the past gameplay sessions, and wherein the trigger is a selection of one of the visual tags.

Generating the summary may include generating a custom flashback sequence with a user-specific narrative, in-game actions, or specific combos or cheat codes previously used in relation to the object associated with the selected visual tag. Generating the summary may include superimposing a ghost version of a previous session over a current session based on the selected customized tag.

Generating the summary may include restoring a status or setting from a previous gameplay session based on respective sets of object data associated with the selected customized tag. Generating the summary may include, while the interactive content title is loading, providing a testing period for the player to refresh their memory of previously played combinations based on respective sets of object data associated with the selected customized tag.

Various aspects of the present disclosure may include methods of generating a customized summary of virtual actions and events. Such methods may include storing one or more sets of object data in memory in association with one or more respective customized tags regarding a plurality of events in gameplay by a player of a respective interactive content title. Such methods may include monitoring gameplay data sent over a communication network from a client device of the player engaged in a current activity of the respective interactive content title within a current gameplay session.

Such methods may include detecting a trigger in the monitored gameplay data, wherein the trigger is associated with a request for a summary that encapsulates actions and events of past gameplay associated with the trigger. Such methods may include selecting a subset of the actions and events of the past gameplay for the summary based on one or more selected customized tags associated with the trigger. Such methods may include generating the summary based on selected subset of the actions and events, wherein the generated summary is provided to the client device for presentation within a virtual environment associated with the interactive content title.

Additional aspects of the present disclosure may include systems for gaze-based generation of virtual effects indicators correlated with directional sounds. Such systems may include one or more databases that store one or more sets of object data in memory in association with one or more respective customized tags regarding a plurality of events in gameplay by a player of a respective interactive content title.

Such system may include one or more processors that executes instructions stored in memory. Execution of the instructions by the one or more processors may monitor gameplay data sent over a communication network from a client device of the player engaged in a current activity of the respective interactive content title within a current gameplay session. Execution of the instructions by the one or more processors may detect a trigger in the monitored gameplay data, wherein the trigger is associated with a request for a summary that encapsulates actions and events of past gameplay associated with the trigger.

Execution of the instructions by the one or more processors may select a subset of the actions and events of the past gameplay for the summary based on one or more selected customized tags associated with the trigger. Execution of the instructions by the one or more processors may generating the summary based on selected subset of the actions and events, wherein the generated summary is provided to the client device for presentation within a virtual environment associated with the interactive content title.

Further aspects of the present disclosure include non-transitory computer-readable medium or storage media having embodied thereon a program executable by a processor to provide a method for generating a customized summary of virtual actions and events.

DETAILED DESCRIPTION

Aspects of the present disclosure include systems and methods for generating a customized summary of virtual actions and events. Engagement in an interactive content title requires that players are paying attention to key actions and events, and many interactive content titles operate on that assumption. Once an event has passed, even if the player was not aware of it, oftentimes the interactive content title continues without an option to go back to what was missed. Therefore, there is a need to provide a service that can provide customized summaries when a trigger is detected that indicates that the player may have missed one or more events or actions during gameplay.

For example, one or more sets of object data may be stored in memory in association with one or more respective customized tags regarding a plurality of events in gameplay by a player of a respective interactive content title. Gameplay data sent over a communication network from a client device of the player engaged in a current activity of the respective interactive content title within a current gameplay session may be monitored. A trigger in the monitored gameplay data may be detected. The trigger may be associated with a request for a summary that encapsulates actions and events of past gameplay associated with the trigger. A subset of the actions and events of the past gameplay for the summary may be selected based on one or more selected customized tags associated with the trigger. The summary may be generated based on the selected subset of the actions and events. The generated summary may be provided to the client device for presentation within a virtual environment associated with the interactive content title.

Figure 1:
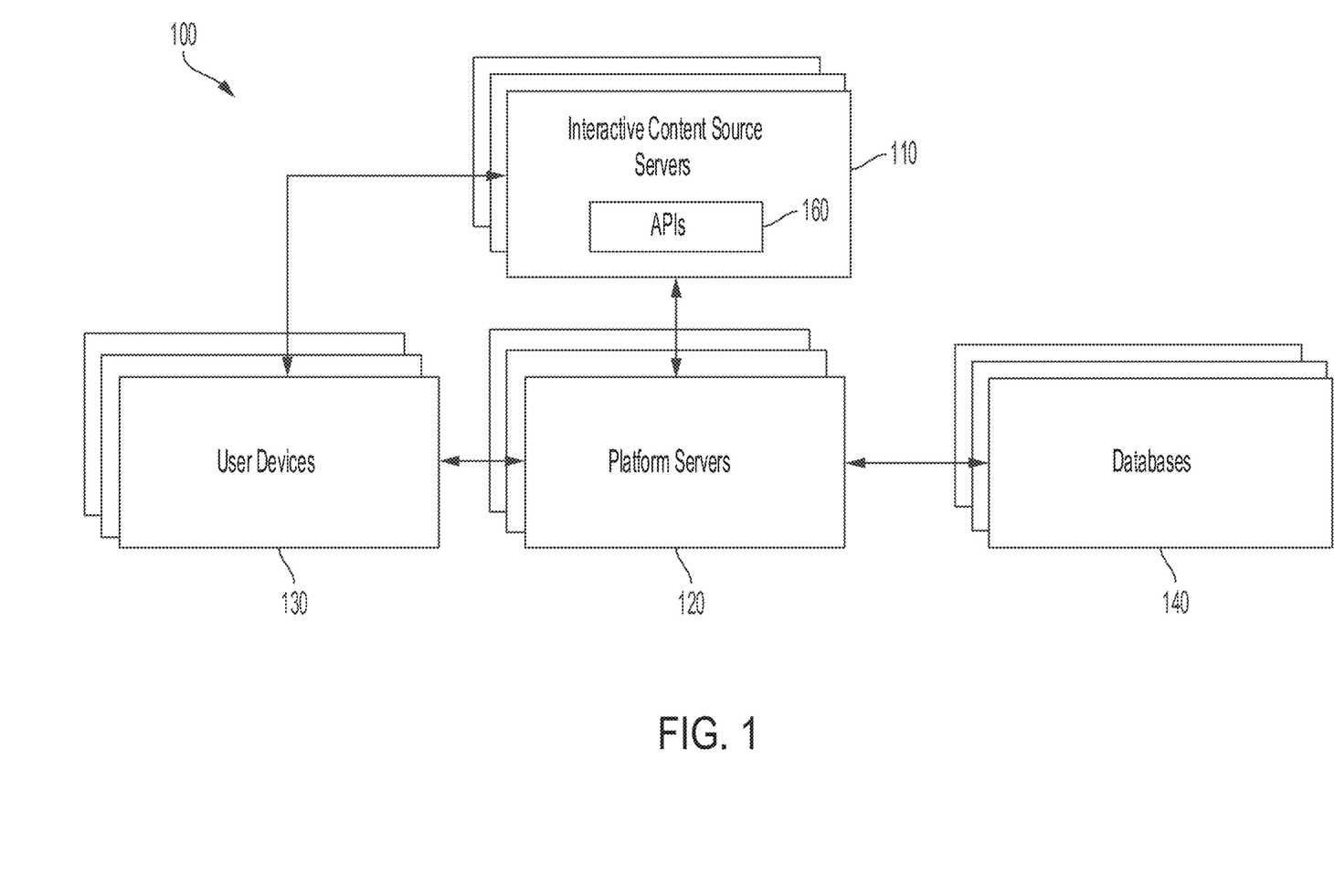
FIG. 1 illustrates an exemplary network environment in which a system for detecting gaze to generate virtual effects indicators correlated with directional sounds may be implemented.

FIG. 1 illustrates a network environment in which a system for detecting gaze to generate virtual effects indicators correlated with directional sounds may be implemented. The network environment 100 may include one or more interactive content servers 110 that provide streaming content (e.g., interactive video, podcasts, etc.), one or more platform servers 120, one or more user devices 130, and one or more databases 140.

Interactive content servers 110 may maintain, stream, and host interactive media available to stream on a user device 130 over a communication network. Such interactive content servers 110 may be implemented in the cloud (e.g., one or more cloud servers). Each media may include one or more sets of object data that may be available for participation (e.g., viewing or interacting with an activity) by a user. Data about the object shown in the media may be stored by the media streaming servers 110, platform servers 120 and/or the user device 130, in an object file 216 ("object file"), as will be discussed in detail with respect to FIGS. 2A and 3.

The platform servers 120 may be responsible for communicating with the different interactive content servers 110, databases 140, and user devices 130. Such platform servers 120 may be implemented on one or more cloud servers. The streaming servers 110 may communicate with multiple platform servers 120, though the media streaming servers 110 may be implemented on one or more platform servers 120. The platform servers 120 may also carry out instructions, for example, receiving a user request from a user to stream streaming media (i.e., games, activities, video, podcasts, User Generated Content ("UGC"), publisher content, etc.). The platform servers 120 may further carry out instructions, for example, for streaming the streaming media content titles. Such streaming media may have at least one object set associated with at least a portion of the streaming media. Each set of object data may have data about an object (e.g., activity information, zone information, actor information, mechanic information, game media information, etc.) displayed during at least a portion of the streaming media.

The streaming media and the associated at least one set of object data may be provided through an application programming interface (API) 160, which allows various types of media streaming servers 110 to communicate with different platform servers 120 and different user devices 130. API 160 may be specific to the particular computer programming language, operating system, protocols, etc., of the media streaming servers 110 providing the streaming media content titles, the platform servers 120 providing the media and the associated at least one set of object data, and user devices 130 receiving the same. In a network environment 100 that includes multiple different types of media streaming servers 110 (or platform servers 120 or user devices 130), there may likewise be a corresponding number of APIs 160.

The user device 130 may include a plurality of different types of computing devices. For example, the user device 130 may include any number of different gaming consoles, mobile devices, laptops, and desktops. In another example, the user device 130 may be implemented in the cloud (e.g., one or more cloud servers). Such user device 130 may also be configured to access data from other storage media, such as, but not limited to memory cards or disk drives as may be appropriate in the case of downloaded services. Such devices 130 may include standard hardware computing components such as, but not limited to network and media interfaces, non-transitory computer-readable storage (memory), and processors for executing instructions that may be stored in memory. These user devices 130 may also run using a variety of different operating systems (e.g., iOS, Android), applications or computing languages (e.g., C++, JavaScript).

The databases 140 may be stored on the platform server 120, the media streaming servers 110, any of the servers 218 (shown in FIG. 2A), on the same server, on different servers, on a single server, across different servers, or on any of the user devices 130. Such databases 140 may store the streaming media and/or an associated set of object data. Such streaming media may depict one or more objects (e.g., activities) that a user can participate in and/or UGC (e.g., screen shots, videos, commentary, mashups, etc.) created by peers, publishers of the media content titles and/or third party publishers. Such UGC may include metadata by which to search for such UGC. Such UGC may also include information about the media and/or peer. Such peer information may be derived from data gathered during peer interaction with an object of an interactive content title (e.g., a video game, interactive book, etc.) and may be "bound" to and stored with the UGC. Such binding enhances UGC as the UGC may deep link (e.g., directly launch) to an object, may provide for information about an object and/or a peer of the UGC, and/or may allow a user to interact with the UGC. One or more user profiles may also be stored in the databases 140. Each user profile may include information about the user (e.g., user progress in an activity and/or media content title, user id, user game characters, etc.) and may be associated to media.

Figure 2A:
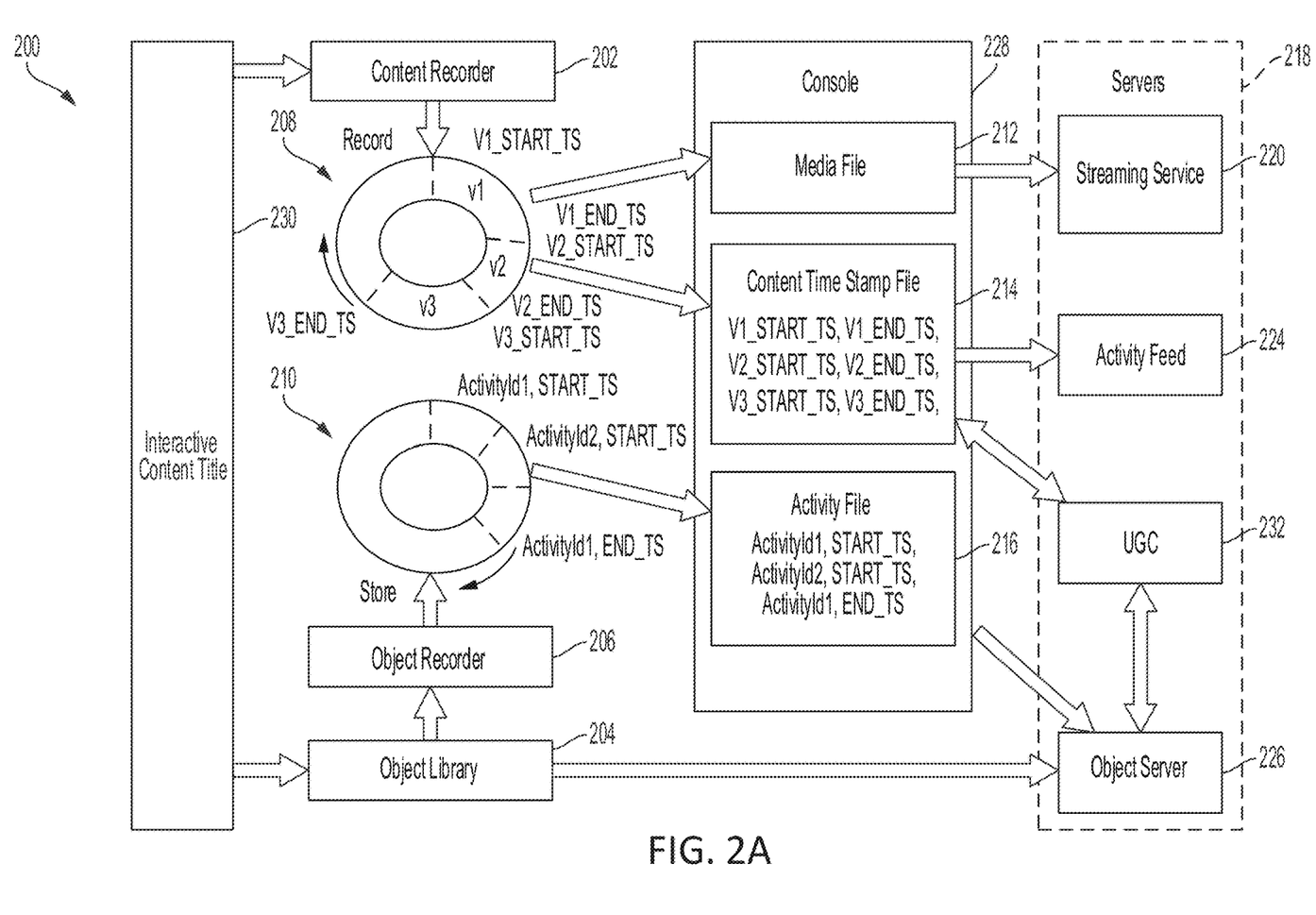
FIG. 2A illustrates an exemplary uniform data system (UDS) that may be used to provide data to a system for detecting gaze to generate virtual effects indicators correlated with directional sounds.

FIG. 2A illustrates an exemplary universal or uniform data system (UDS) that may be used to provide data to a system for detecting gaze to generate virtual effects indicators correlated with directional sounds. Based on data provided by UDS, platform server 120 can be made aware of what in-game objects, entities, activities, and events that users have engaged with, and thus support analysis of and coordination with in-game activities. Each user interaction may be associated the metadata for the type of in-game interaction, location within the in-game environment, and point in time within an in-game timeline, as well as other players, objects, entities, etc., involved. Thus, metadata can be tracked for any of the variety of user interactions that can occur in during a game session, including associated activities, entities, settings, outcomes, actions, effects, locations, and character stats. Such data may further be aggregated, applied to data models, and subject to analytics. Such a UDS data model may be used to assign contextual information to each portion of information in a unified way across games.

As illustrated in FIG. 2A, an exemplary console 228 (e.g., a user device 130) and exemplary servers 218 (e.g., streaming server 220, an activity feed server 224, an user-generated content (UGC) server 232, and an object server 226) are shown. In one example, the console 228 may be implemented on the platform server 120, a cloud server, or on any of the servers 218. In an exemplary example, a content recorder 202 may be implemented on the platform server 120, a cloud server, or on any of the servers 218. Such content recorder 202 receives and records content (e.g., media) from an interactive content title 230 onto a content ring-buffer 208. Such ring-buffer 208 may store multiple content segments (e.g., v1, v2 and v3), start times for each segment (e.g., V1_START_TS, V2_START_TS, V3_START_TS), and end times for each segment (e.g., V1_END_TS, V2_END_TS, V3_END_TS). Such segments may be stored as a media file 212 (e.g., MP4, WebM, etc.) by the console 228. Such media file 212 may be uploaded to the streaming server 220 for storage and subsequent streaming or use, though the media file 212 may be stored on any server, a cloud server, any console 228, or any user device 130. Such start times and end times for each segment may be stored as a content time stamp file 214 by the console 228. Such content time stamp file 214 may also include a streaming ID, which matches a streaming ID of the media file 212, thereby associating the content time stamp file 214 to the media file 212. Such content time stamp file 214 may be uploaded and stored to the activity feed server 224 and/or the UGC server 232, though the content time stamp file 214 may be stored on any server, a cloud server, any console 228, or any user device 130.

Concurrent to the content recorder 202 receiving and recording content from the interactive content title 230, an object library 204 receives data from the interactive content title 230, and an object recorder 206 tracks the data to determine when an object begins and ends. The object library 204 and the object recorder 206 may be implemented on the platform server 120, a cloud server, or on any of the servers 218. When the object recorder 206 detects an object beginning, the object recorder 206 receives object data (e.g., if the object were an activity, user interaction with the activity, activity ID, activity start times, activity end times, activity results, activity types, etc.) from the object library 204 and records the activity data onto an object ring-buffer 210 (e.g., ActivityID1, START_TS; ActivityID2, START_TS; ActivityID3, START_TS). Such activity data recorded onto the object ring-buffer 210 may be stored in the object file 216. Such object file 216 may also include activity start times, activity end times, an activity ID, activity results, activity types (e.g., competitive match, quest, task, etc.), user or peer data related to the activity. For example, an object file 216 may store data regarding an item used during the activity. Such object file 216 may be stored on the object server 226, though the object file 216 may be stored on any server, a cloud server, any console 228, or any user device 130.

Such object data (e.g., the object file 216) may be associated with the content data (e.g., the media file 212 and/or the content time stamp file 214). In one example, the UGC server 232 stores and associates the content time stamp file 214 with the object file 216 based on a match between the streaming ID of the content time stamp file 214 and a corresponding activity ID of the object file 216. In another example, the object server 226 may store the object file 216 and may receive a query from the UGC server 232 for an object file 216. Such query may be executed by searching for an activity ID of an object file 216 that matches a streaming ID of a content time stamp file 214 transmitted with the query. In yet another example, a query of stored content time stamp files 214 may be executed by matching a start time and end time of a content time stamp file 214 with a start time and end time of a corresponding object file 216 transmitted with the query. Such object file 216 may also be associated with the matched content time stamp file 214 by the UGC server 232, though the association may be performed by any server, a cloud server, any console 228, or any user device 130. In another example, an object file 216 and a content time stamp file 214 may be associated by the console 228 during creation of each file 216, 214.

Figure 2B:
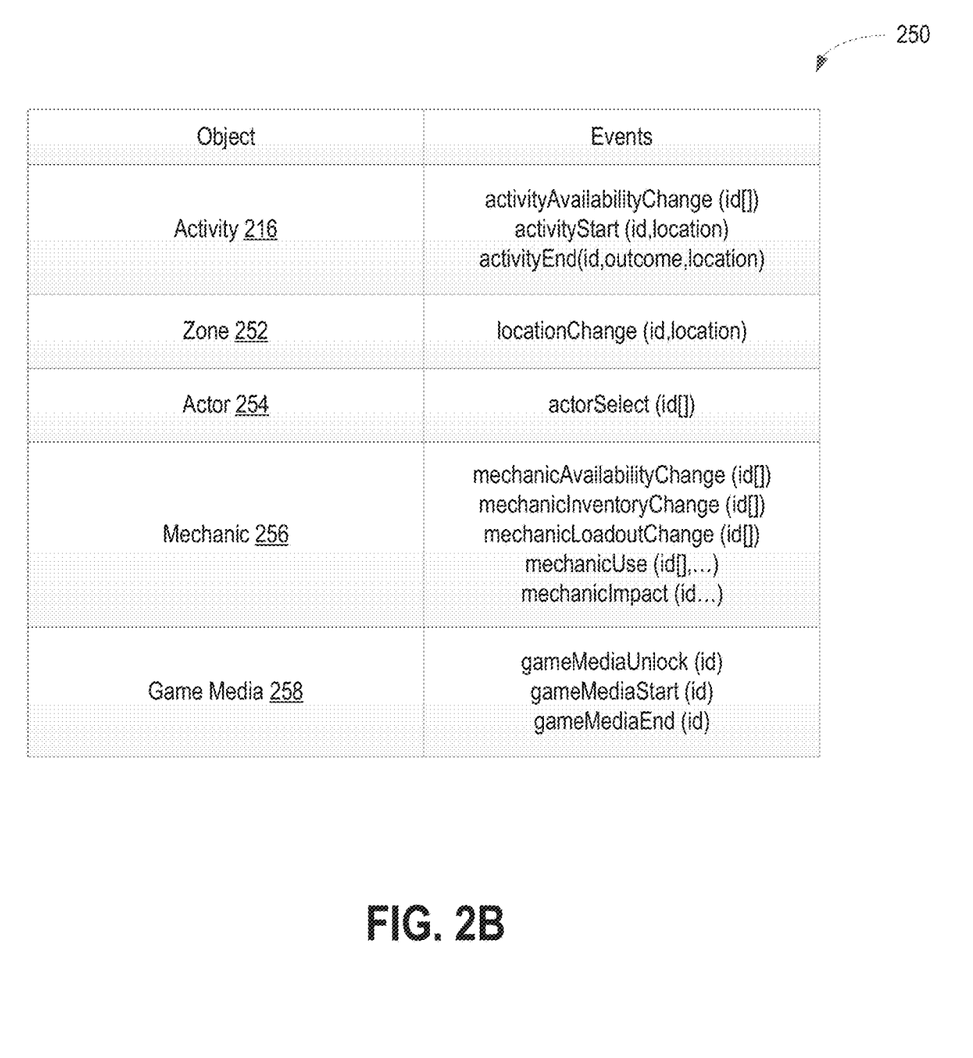
FIG. 2B illustrates an exemplary table of various objects and associated events, according to an aspect of the present disclosure.

As shown in the example table 250 of FIG. 2B, such object data (e.g., the object file 216) may be associated with event information regarding activity availability change and may be related to other objects with associated object information. Media-object bindings may form telemetry between the objects shown in at least a portion of the live-streaming media and the live-streaming media. For example, such object data may be zone data files 252, actor data files 254, mechanics data files 256, game media data files 258, and other gameplay-related data files.

Such object data (e.g., the object file 216) may be categorized as in in progress, open-ended, or competitive. Such activity data files 216 may include optional properties, such as a longer description of the activity, an image associated with the activity, if the activity is available to players before launching the game, whether completion of the activity is required to complete the game, whether the activity can be played repeatedly in the game, and whether there are nested tasks or associated child activities. Such activity data files 216 may include an activity availability change event for, which may indicate a list or array of currently available activities for the player. For example, this may be used to decide what activities to display in a game plan.

Such zone data files 252 may indicate an area of an associated game world with a single coordinate system wherein the zone may have a 2-D map associated with it, and may be used to display locations on the zone. If zone data files 252 are applicable, each zone may include a zone ID and a short localizable name of the Zone. Such zone data files 252 may be associated with a view projection matrix (4×4) to convert from 3-D world coordinates to a 2-D map position. Such zone data files 252 may be associated with a location change event that indicates an update to a current in-game location of the player. Such location change event may be posted regularly, or whenever the player's in-game location changes significantly. The platform server 120 may store a latest value in 'state.' Such zone data files 252 may include an x, y, z position of the player's character in the zone as well as an a, b, c vector indicating the player's characters orientation or direction. Such zone data files 252 may be associate with an activity start event and/or an activity end event and for the activity end event, an outcome of completed, failed, or abandoned may be associated to the activity (e.g., activity ID).

Such actor data files 254 may be associated with an entity with behaviors in the game, and can be player-controller or game-controlled, and can change dynamically during gameplay. Such actor data files 254 may include an actor ID for the actor, a localizable name for the actor, an image of the actor, and/or a short description of the actor. Such actor data files 254 may be associated with an actor select event that indicates that the player's selected actor(s) have changed. The selected actor(s) may represent the actors the player is controlling in the game and may be displayed on the player's profile and other spaces via the platform server 120. There may be more than one actor selected at time and each game may replace its list of actors upon loading save data.

Such mechanics data files 256 may be associated with an item, skill, or effect that can be used by the player or the game to impact gameplay (e.g., bow, arrow, stealth attack, fire damage) and may exclude items that do no impact gameplay (e.g., collectibles). Such mechanics data files 256 may include a mechanic ID of the mechanic, a short name of the mechanic, an image of the mechanic, and/or a short description of the mechanic. Such mechanics data files 256 may be associated with a mechanic availability change event that indicates that the mechanics available to the player have changed. Available may mean that the mechanic is available in the game world for the player to use, but may require the player to go through some steps to acquire it into inventory (e.g., buy from a shop, pick up from the world) before using it. Each game may replace its list of mechanics upon loading save data.

Such mechanics data files 256 may be associated with a mechanic inventory change event that indicates that the player's inventory has changed. Inventory may refer to mechanics that are immediately usable to the player without having to take additional steps in the game before using it. Inventory information is used to estimate a player's readiness for various activities, which may be forwarded to the platform server 120. Games may replace its list of mechanic inventory upon loading save data. Mechanics on cool down may be considered part of the inventory. Mechanic counts (e.g., ammunition, healing points) with any non-zero value may be treated as "in inventory." Inventory mechanics may be considered a subset of available mechanics.

Such mechanics data files 256 may be associated with a mechanic use event that indicates that a mechanic has been used by or against the player and may be used to be displayed as mechanic usage in a UGC context. Such mechanics data files 256 may include a list or array of mechanics that were used (e.g, fire arrow, fire damage) or whether an initiator is the player, such that whether the mechanics were used by or against the player. Such mechanics data files 256 may include an initiator actor ID, a current zone ID of the initiator actor, and/or a current x, y, z position of the initiator actor. Such mechanics data files 256 may be associated with a mechanic impact event that indicates that a mechanic had impact on gameplay (e.g., an arrow hit an enemy) and may be used to display mechanic image in a UGC context. Mechanic use and mechanic image events may be not linked. Such mechanics data files 256 may include the initiator action ID, the current zone ID of the initiator actor, the current x, y, z position of the initiator actor, a target actor ID, a current zone ID of the target actor, a current x, y, z of the target actor, and a mitigation mechanic that may mitigate the initiator mechanic.

Such game media data files 258 may be include a game media ID of the game media, a localizable name for the game media, a media format (e.g., image, audio, video, text, etc.), a category or type of media (cut-scene, audiolog, poster, developer commentary, etc.), a URL or a server-provisioned media file, and/or whether the game media is associated with a particular activity. Such game media data files 258 may be associated with a game media start event that indicates that a particular piece of game media has started in the game right now and a game media end event that indicates that the particular piece of game media has ended.

Furthermore, a generated customized summary may be sharable such that aspects of the generated customized summary may be stored as object data for other players to use. For example, other plays may gain vision into how a specific quest or activity was completed or ask others how to complete a quest or activity if they are still having issues after viewing the generated customized summary.

Figure 3:
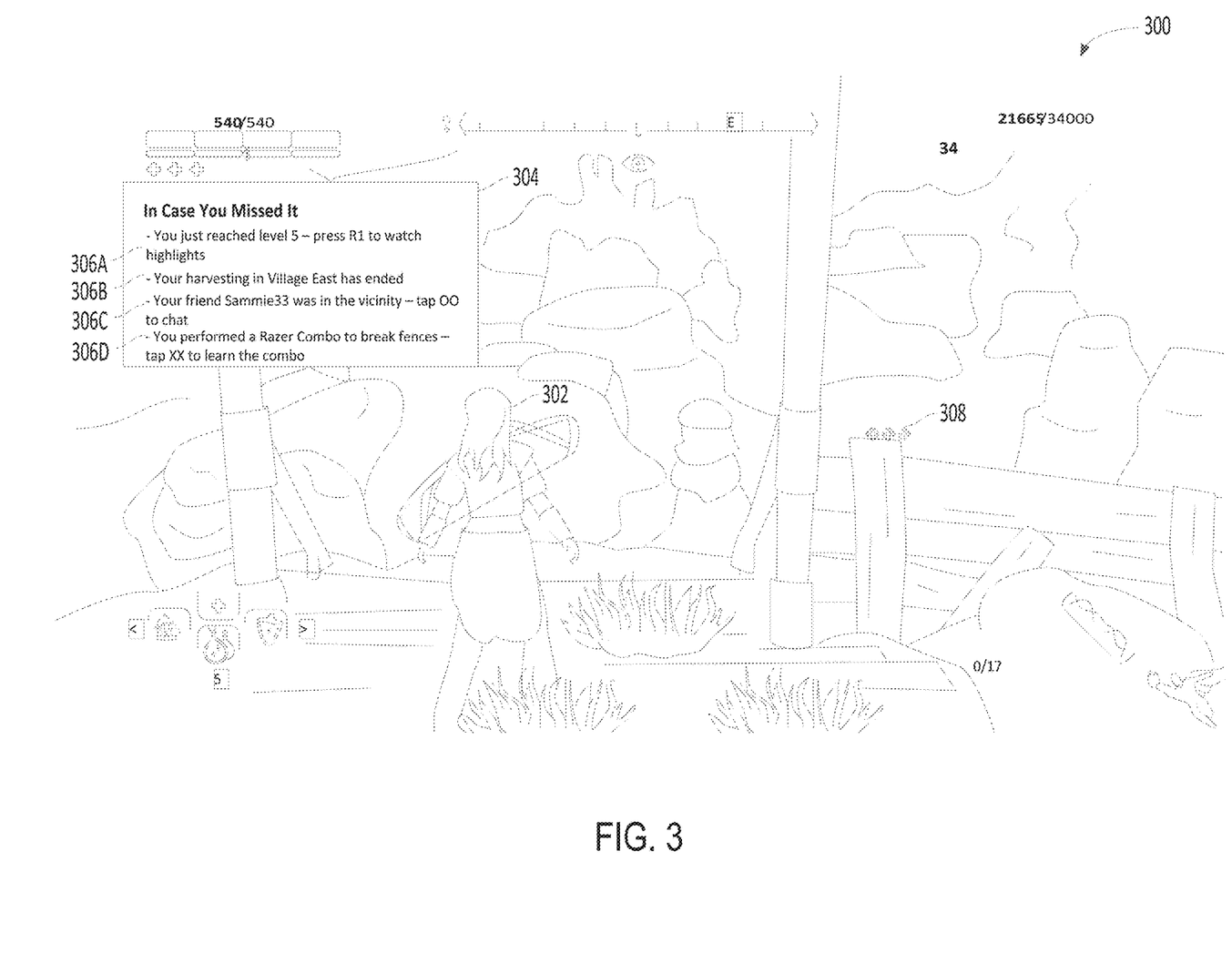
FIG. 3 illustrates an exemplary display with a generated customized summary of virtual actions and events.

FIG. 3 illustrates an example display with a generated customize summary. In a display 300 of a client device, an example third-person perspective of a player 302 in a gaming environment is shown. From the player's perspective, the player 302 is in a virtual environment of an interactive content title and has played a certain amount of time in a current session. For a number of reasons, the player may have missed one or more actions or events that have occurred. Triggers indicating that the player may have missed the one or more actions or events were detected. The trigger may be that the player has not moved for a period of time that passes a threshold limit. The trigger may be that gaze detection indicates that the player was not looking at the screen when the one or more actions or events occurred. The trigger may be that a period of time has passed during the game and there is a setting to summarize key highlights from the past period of time so that the player is reminded of what has happened.

In a customized generated summary 304, one or more actions or events 306 may be displayed. For example, a first past event 306A may indicate that the player has reached a certain level or milestone. Often times, the first past event 306A or similar past events can be missed because they are only indicated at the corner of the screen. In some aspects, reaching a certain milestone can mean that the player can perform another action that they were meaning to do so a reminder that the milestone is reach can be helpful. This is especially true if the trigger indicates that the player did not see that they reached that milestone on the display 300.

As discussed in more detail below, the object data may be tagged with customized tags that are used to create the customized summaries. In some aspects, certain portions of gameplay may be tagged the portion selected for tagging was determined to have adjusted a relevant storyline of the interactive content title. In some aspects, a highlight reel may be generated for optional viewing and storage so that the player can re-watch particular actions and events that occurred that resulted in reaching their milestone, with the particular actions and events having been tagged by a customized tag.

A second past event 306B may indicate that something has occurred within the game in another area of the virtual environment that would be interesting. Sometimes these events are provided as notifications that go away after a couple of seconds and if the player was not paying attention, they could have missed it. In this case, the harvesting in Village East has ended and the player has the option to go back to Village East and reap their harvest if they so wish.

A third past event 306C may indicate that a player Sammie33 that is friends with the player was in the vicinity. The player may have missed that player Sammie33 was nearby and notifying the player about such a past event may help them search for their friend who was nearby recently. This may give the player the opportunity to engage with the friend who was nearby and coordinate meeting up.

As an example, the player Sammie33 being nearby may be associated with an actor object 254 and may be stored in association with a timestamp during which the player Sammie33 was nearby. When a trigger is detected that indicates that the player may not have been paying attention, if the timestamp of when player Sammie33 was nearby or when a notification indicating that player Sammie33 was nearby was within a time limit associated with the trigger, a customized summary associated with actor object 254 may be generated.

A fourth past action 306D may indicate that the player has performed a Razer Combo and perhaps the player may have forgotten what buttons or other types of input used to perform the Razer Combo in the virtual environment. The player may be reminded of how the combo works. In some aspects, the fourth past action 306D may have been triggered by the player selecting virtual tag 308 that is associated with the fence, which is object data that is stored to be associated with the Razer Combo that the player has once played. Similarly, the player may be reminded of specific cheat codes used (e.g., to obtain certain advances or advantages) within past sessions.

In addition, virtual objects in a three-dimensional virtual environment can be flagged with a visual tag 308 and a trigger to create a customized summary may be a selection of the visual tag, which would summarize a last event or action associated with the flagged object.

Figure 4:
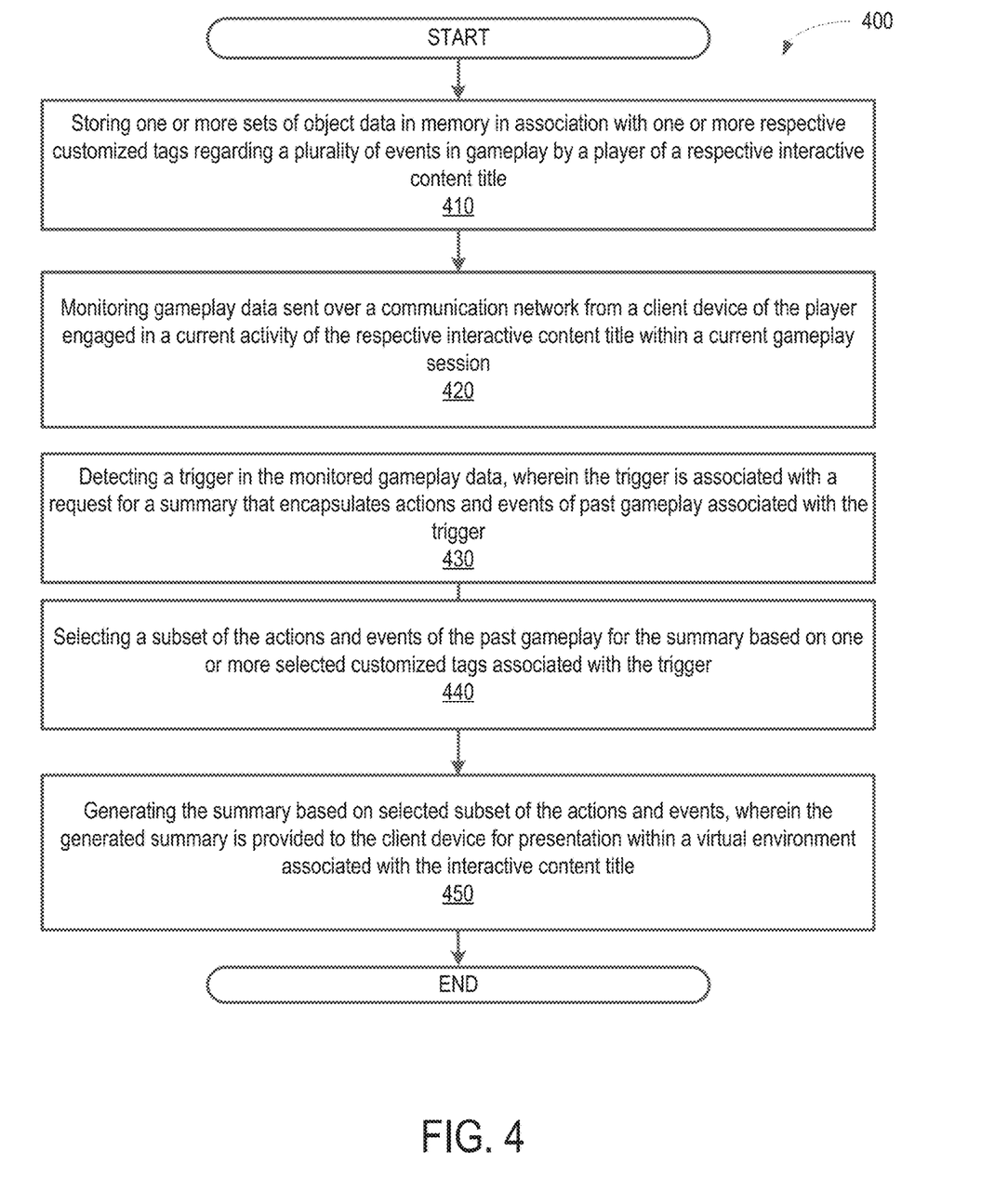
FIG. 4 illustrates a flowchart of an example method for generating a customized summary of virtual actions and events, according to an aspect of the present disclosure.

FIG. 4 is a flowchart illustrating an example method 400 for generating a customized summary of virtual actions and events. The method 400 of FIG. 4 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The execution of the instructions may be implemented on the cloud servers (e.g., the steps identified in FIG. 4 are performed in the cloud). The steps identified in FIG. 4 (and the order thereof) are examples and may include various alternatives, equivalents, or derivations thereof including but not limited to the order of execution of the same.

In step 410, one or more sets of object data may be stored in memory in association with one or more respective customized tags regarding a plurality of events in gameplay by a player of a respective interactive content title. In some aspects, the one or more sets of object data may be stored similar to the object data from FIGS. 2A-2B.

In some aspects, a portion of the stored one or more sets of object data may be tagged with customized tags at an end of a gameplay session, wherein the portion selected for tagging was determined to have met a threshold of significance in a relevant storyline of the interactive content title. Captured media clips associated with the customized tags may be stored and other captured media clips that are not associated with the customized tags may be deleted. This may help with storing on highlight reels rather than the entire gameplay session.

In step 420, gameplay data may be monitored and sent over a communication network from a client device of the player engaged in a current activity of the respective interactive content title within a current gameplay session. The gameplay data may be indicative of at least one of objects, places, characters within a three-dimensional virtual environment or at least one of objectives, levels, and milestones within the interactive content title.

In step 430, a trigger may be detected in the monitored gameplay data. The trigger may be associated with a request for a summary that encapsulates actions and events of past gameplay associated with the trigger. In some aspects, the trigger may be gaze detection indicating that the player was not paying attention. Gaze data may be tracked via a camera associated with the client device during the current gameplay session to identify a point of focus within a three-dimensional virtual environment of the respective interactive content title towards which one or both eyes of the player are focused. The point of focus indicated by the gaze data may be identified as not focused within the three-dimensional virtual environment during a period of distraction. The trigger may be based on the point of focus not focused within the three-dimensional virtual environment for more than threshold limit, and wherein the selected subset includes activities and events associated with the identified period of distraction.

In step 440, a subset of the actions and events of the past gameplay may be selected for the summary based on one or more selected customized tags associated with the trigger. The selection may be time based and how recently the trigger was detected for each action or event. The selection may be in the order of importance, which may be based on an internal points system that scores various triggers or events/actions to a higher value.

In step 450, the summary may be generated based on selected subset of the actions and events, wherein the generated summary is provided to the client device for presentation within a virtual environment associated with the interactive content title. Generating the summary may include generating a highlight reel based on the stored captured media clips.

In some aspects, an overlay may be provided that includes visual tags and respective metrics associated with virtual objects in a three-dimensional virtual environment of the respective interactive content title. The virtual objects are visually tagged based on interaction with the player during one of the past gameplay sessions. The trigger may be a selection of one of the visual tags. In some aspects, a ghost version of a previous session may be superimposed over a current session based on the selected customized tag. In some aspects, the summary may be generated to include generating a custom flashback sequence with a user-specific narrative and actions or specific combos previously used in relation to the object associated with the selected visual tag. In some aspects, combos that have been used and associated objects may be tracked and instructions for how to learn the combos may be provided. As such, when there is a particular combo that is associated with an object that is displayed, that object may be flagged, like the visual tag 308 in FIG. 3.

In some aspects, a status or setting from a previous gameplay session may be restored based on respective sets of object data associated with the selected customized tag. In some cases, while the interactive content title is loading, a testing period may be provided for the player to refresh their memory of previously played combinations based on respective sets of object data associated with the selected customized tag.

Figure 5:
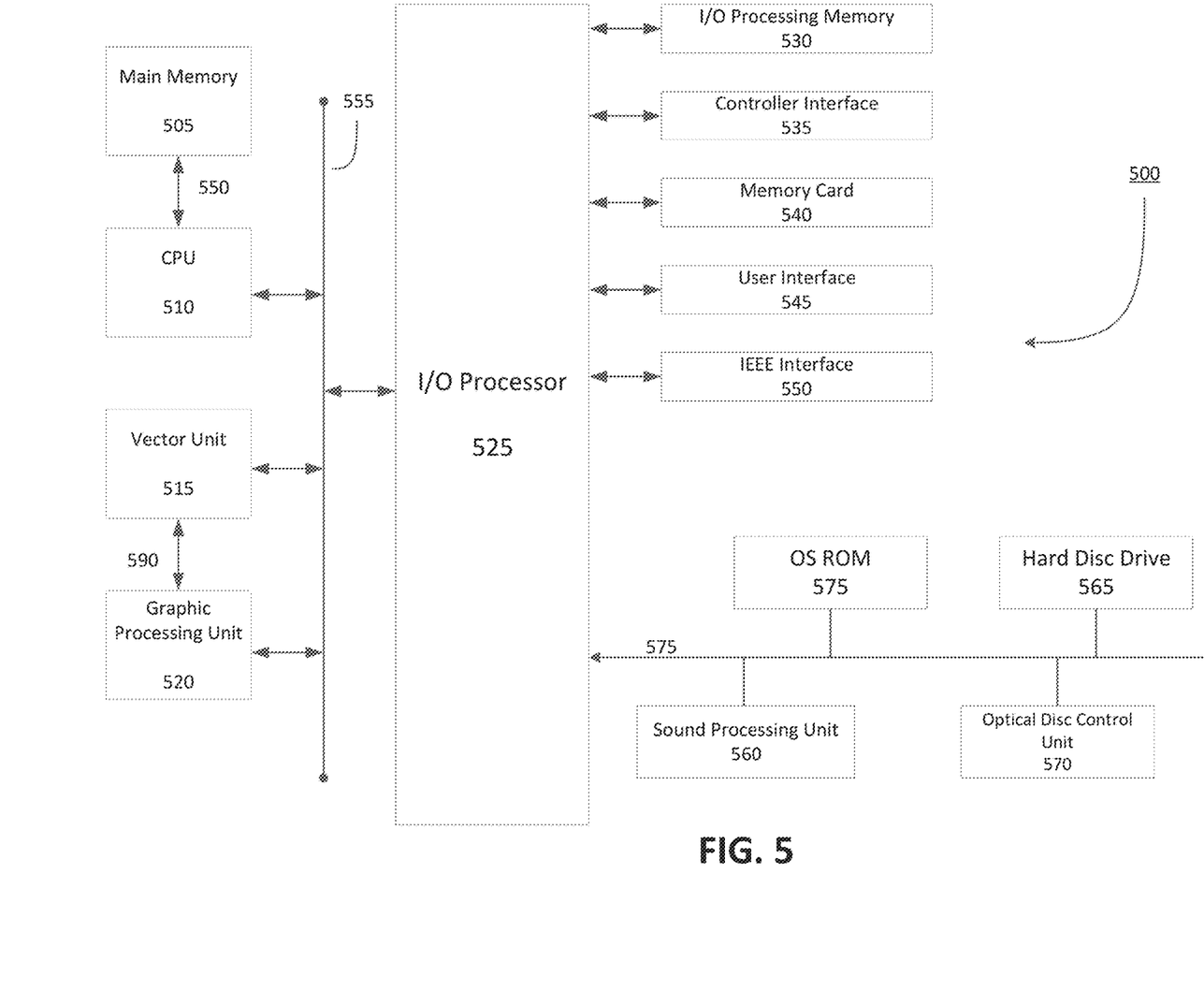
FIG. 5 is a block diagram of an exemplary electronic entertainment system that may be used in embodiments of the present invention.

FIG. 5 is a block diagram of an exemplary electronic entertainment system 500. The entertainment system 500 of FIG. 5 includes a main memory 505, a central processing unit (CPU) 510, vector unit 515, a graphics processing unit 520, an input/output (I/O) processor 525, an I/O processor memory 530, a controller interface 535, a memory card 540, a Universal Serial Bus (USB) interface 545, and an IEEE interface 550. The entertainment system 500 further includes an operating system read-only memory (OS ROM) 575, a sound processing unit 560, an optical disc control unit 570, and a hard disc drive 565, which are connected via a bus 575 to the I/O processor 525.

Entertainment system 500 may be an electronic game console. Alternatively, the entertainment system 500 may be implemented as a general-purpose computer, a set-top box, a hand-held game device, a tablet computing device, or a mobile computing device or phone. Entertainment systems may contain more or less operating components depending on a particular form factor, purpose, or design.

The CPU 510, the vector unit 515, the graphics processing unit 520, and the I/O processor 525 of FIG. 5 communicate via a system bus 555. Further, the CPU 510 of FIGURE communicates with the main memory 505 via a dedicated bus 550, while the vector unit 515 and the graphics processing unit 520 may communicate through a dedicated bus 590. The CPU 510 of FIG. 5 executes programs stored in the OS ROM 575 and the main memory 505. The main memory 505 of FIG. 5 may contain pre-stored programs and programs transferred through the I/O Processor 525 from a CD-ROM, DVD-ROM, or other optical disc (not shown) using the optical disc control unit 570. I/O Processor 525 of FIG. 5 may also allow for the introduction of content transferred over a wireless or other communications network (e.g., 4$, LTE, 3G, and so forth). The I/O processor 525 of FIG. 5 primarily controls data exchanges between the various devices of the entertainment system 500 including the CPU 510, the vector unit 515, the graphics processing unit 520, and the controller interface 535.

The graphics processing unit 520 of FIG. 5 executes graphics instructions received from the CPU 510 and the vector unit 515 to produce images for display on a display device (not shown). For example, the vector unit 515 of FIG. 5 may transform objects from three-dimensional coordinates to two-dimensional coordinates, and send the two-dimensional coordinates to the graphics processing unit 520. Furthermore, the sound processing unit 560 executes instructions to produce sound signals that are outputted to an audio device such as speakers (not shown). Other devices may be connected to the entertainment system 500 via the USB interface 545, and the IEEE 1394 interface 550 such as wireless transceivers, which may also be embedded in the system 500 or as a part of some other component such as a processor.

A user of the entertainment system 500 of FIG. 5 provides instructions via the controller interface 535 to the CPU 510. For example, the user may instruct the CPU 510 to store certain game information on the memory card 540 or other non-transitory computer-readable storage media or instruct a character in a game to perform some specified action.

The present invention may be implemented in an application that may be operable by a variety of end user devices. For example, an end user device may be a personal computer, a home entertainment system (e.g., Sony PlayStation2® or Sony PlayStation3® or Sony PlayStation4®), a portable gaming device (e.g., Sony PSP® or Sony Vita®), or a home entertainment system of a different albeit inferior manufacturer. The present methodologies described herein are fully intended to be operable on a variety of devices. The present invention may also be implemented with cross-title neutrality wherein an embodiment of the present system may be utilized across a variety of titles from various publishers.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A computer-implemented method for generating a customized summary of virtual actions and events, the computer-implemented method comprising:
   storing one or more sets of object data associated with historical gameplay data in memory;
   assigning one or more customized tags to the one or more sets of object data, each of the customized tags regarding a plurality of events that meet a threshold of significance in an identified storyline in gameplay by a player of a respective interactive content title, wherein the threshold is compared to one or more scores of the events as scored in accordance with a point system;
   monitoring gameplay data sent over a communication network from a client device of the player engaged in a current activity of the respective interactive content title within a current gameplay session;
   detecting a trigger in the monitored gameplay data, wherein the trigger is associated with a request for a summary that encapsulates actions and events of past gameplay associated with the trigger;
   selecting a subset of the actions and events of the past gameplay for the summary based on one or more selected customized tags associated with the trigger and scores assigned to the subset of actions and events in accordance with the point system; and
   generating the summary based on selected subset of the actions and events, wherein the generated summary is provided to the client device for presentation within a virtual environment associated with the interactive content title.

2. The computer-implemented method of claim 1, further comprising:
   tracking gaze data via a camera associated with the client device during the current gameplay session to identify a point of focus within a three-dimensional virtual environment of the respective interactive content title towards which one or both eyes of the player are focused; and
   identifying that the point of focus indicated by the gaze data is not focused within the three-dimensional virtual environment during a period of distraction, wherein the trigger is based on the point of focus not being focused within the three-dimensional virtual environment for more than threshold limit, and wherein the selected subset includes activities and events associated with the identified period of distraction.

3. The computer-implemented method of claim 1, further comprising tagging a portion of the stored one or more sets of object data with customized tags at an end of a gameplay session, wherein the portion selected for tagging was determined to have adjusted a relevant storyline of the interactive content title.

4. The computer-implemented method of claim 3, further comprising:
   storing captured media clips associated with the customized tags; and
   deleting other captured media clips that are not associated with the customized tags.

5. The computer-implemented method of claim 4, wherein the summary includes a highlight reel based on the stored captured media clips.

6. The computer-implemented method of claim 1, wherein the gameplay data is indicative of at least one of objects, places, characters within a three-dimensional virtual environment or at least one of objectives, levels, and milestones within the interactive content title.

7. The computer-implemented method of claim 1, further comprising generating an overlay that includes visual tags and respective metrics associated with virtual objects in a three-dimensional virtual environment of the respective interactive content title, wherein the virtual objects are visually tagged based on interaction with the player during one of the past gameplay sessions, and wherein the trigger is a selection of one of the visual tags.

8. The computer-implemented method of claim 7, wherein the summary includes a custom flashback sequence with a user-specific narrative that includes one or more in-game actions and associated instructions for one or more combos or cheat codes previously used in relation to the object associated with the selected visual tag.

9. The computer-implemented method of claim 7, further comprising:
   tracking combos that have been used and associated objects; and
   generating instructions regarding entry of the combos into the client device.

10. The computer-implemented method of claim 1, wherein the summary includes an overlay that superimposes a ghost version of a previous session over a display of the current gameplay session based on the selected customized tag.

11. The computer-implemented method of claim 1, wherein generating the summary includes restoring a status or setting from a previous gameplay session based on respective sets of object data associated with the selected customized tag.

12. The computer-implemented method of claim 1, wherein the summary is presented during a testing period, wherein the summary includes data regarding on previously played combinations indicated by respective sets of object data associated with the selected customized tag.

13. A system for generating a customized summary of virtual actions and events, the system comprising:
   one or more databases in memory, the databases one or more sets of object data associated with historical gameplay data in memory; and
   one or more processors that execute instructions stored in memory, wherein the processors execute the instructions for:
   assigning one or more customized tags to the one or more sets of object data, each of the customized tags regarding a plurality of events that meet a threshold of significance in an identified storyline in gameplay by a player of a respective interactive content title, wherein the threshold is compared to one or more scores of the events as scored in accordance with a point system;
   monitoring gameplay data sent over a communication network from a client device of the player engaged in a current activity of the respective interactive content title within a current gameplay session;

detecting a trigger in the monitored gameplay data, wherein the trigger is associated with a request for a summary that encapsulates actions and events of past gameplay associated with the trigger;

selecting a subset of the actions and events of the past gameplay for the summary based on one or more selected customized tags associated with the trigger and scores assigned to the subset of actions and events in accordance with the point system; and generating the summary based on selected subset of the actions and events, wherein the generated summary is provided to the client device for presentation within a virtual environment associated with the interactive content title.

14. The system of claim 13, wherein execution of the instructions by the one or more processors:

tracks gaze data via a camera associated with the client device during the current gameplay session to identify a point of focus within a three-dimensional virtual environment of the respective interactive content title towards which one or both eyes of the player are focused; and identifies that the point of focus indicated by the gaze data is not focused within the three-dimensional virtual environment during a period of distraction, wherein the trigger is based on the point of focus not being focused within the three-dimensional virtual environment for more than threshold limit, and wherein the selected subset includes activities and events associated with the identified period of distraction.

15. The system of claim 13, wherein the processors execute further instructions to tag a portion of the stored one or more sets of object data with customized tags at an end of a gameplay session, wherein the portion selected for tagging was determined to have adjusted a relevant storyline of the interactive content title.

16. The system of claim 15, wherein memory further stores captured media clips associated with the customized tags, and wherein the processors execute further instructions to delete other captured media clips that are not associated with the customized tags.

17. The system of claim 16, wherein the summary includes a highlight reel based on the stored captured media clips.

18. The system of claim 13, wherein the processors execute further instructions to generate an overlay that includes visual tags and respective metrics associated with virtual objects in a three-dimensional virtual environment of the respective interactive content title, wherein the virtual objects are visually tagged based on interaction with the player during one of the past gameplay sessions, and wherein the trigger is a selection of one of the visual tags.

19. The system of claim 18, wherein the summary includes a custom flashback sequence with a user-specific narrative that includes one or more in-game actions and associated instructions for one or more combos or cheat codes previously used in relation to the object associated with the selected visual tag.

20. A non-transitory computer-readable storage medium having embodied thereon a program executable by one or more processors to perform a method for generating a customized summary of virtual actions and events, the method comprising:

storing one or more sets of object data associated with historical gameplay data in memory;

assigning one or more customized tags to the one or more sets of object data, each of the customized tags regarding a plurality of events that meet a threshold of significance in an identified storyline in gameplay by a player of a respective interactive content title, wherein the threshold is compared to one or more scores of the events as scored in accordance with a point system;

monitoring gameplay data sent over a communication network from a client device of the player engaged in a current activity of the respective interactive content title within a current gameplay session;

detecting a trigger in the monitored gameplay data, wherein the trigger is associated with a request for a summary that encapsulates actions and events of past gameplay associated with the trigger;

selecting a subset of the actions and events of the past gameplay for the summary based on one or more selected customized tags associated with the trigger and scores assigned to the subset of actions and events in accordance with the point system; and generating the summary based on selected subset of the actions and events, wherein the generated summary is provided to the client device for presentation within a virtual environment associated with the interactive content title.

* * * * *